US009583132B2

(12) United States Patent
Bertels

(10) Patent No.: US 9,583,132 B2
(45) Date of Patent: Feb. 28, 2017

(54) ARRANGEMENT FOR ROTATABLY DRIVING A ROUND DISK

(71) Applicant: Eco-Logical Enterprises B.V., Amersfoort (NL)

(72) Inventor: Augustinus Wilhelmus Maria Bertels, Doorwerth (NL)

(73) Assignee: Eco-Logical Enterprises B.V., Amersfoort (NL)

( * ) Notice: Subject to any disclaimer, the term of this patent is extended or adjusted under 35 U.S.C. 154(b) by 0 days.

(21) Appl. No.: 14/907,057

(22) PCT Filed: Jul. 21, 2014

(86) PCT No.: PCT/NL2014/050497
§ 371 (c)(1),
(2) Date: Jan. 22, 2016

(87) PCT Pub. No.: WO2015/012685
PCT Pub. Date: Jan. 29, 2015

(65) Prior Publication Data
US 2016/0180878 A1    Jun. 23, 2016

(30) Foreign Application Priority Data

Jul. 24, 2013 (NL) .................................... 2011214

(51) Int. Cl.
*G11B 19/20* (2006.01)
*G11B 5/55* (2006.01)

(52) U.S. Cl.
CPC ......... *G11B 19/2009* (2013.01); *G11B 5/5573* (2013.01); *G11B 5/5578* (2013.01)

(58) Field of Classification Search
CPC .. G11B 19/20; G11B 19/2036; G11B 19/2009
(Continued)

(56) References Cited

U.S. PATENT DOCUMENTS

| 728,038 A | 5/1903 | Stowe |
| 4,132,414 A | 1/1979 | Dinsdale |

(Continued)

FOREIGN PATENT DOCUMENTS

| AT | 390 600 | 5/1990 |
| DE | 2305776 | 8/1974 |

(Continued)

OTHER PUBLICATIONS

International Search Report from PCT/NL2014/050497 dated Apr. 2, 2015.
(Continued)

*Primary Examiner* — Allen T Cao
(74) *Attorney, Agent, or Firm* — Swanson & Bratschun, L.L.C.

(57) ABSTRACT

A device for rotary driving of a round disk, for instance a memory disk of a computer, comprises a stator disposed fixedly relative to a frame and a rotor rotatably drivable relative to the stator.
According to the invention the rotor comprises a concentric ring to which the peripheral edge of the disk is connected. The stator has an encircling recess, the form of which corresponds to that of the ring such that the ring fits with clearance into the recess. The rotor is provided with two collars of magnetically active elements in angularly equidistant arrangement, and the stator comprises electromagnets disposed at the same angular distances.
The arrangement is such that the rotor and the stator together form an annular induction motor.
The rotor is preferably suspended magnetically during operation.

15 Claims, 17 Drawing Sheets

(58) Field of Classification Search
USPC .......... 360/264, 266, 269; 310/90; 384/112
See application file for complete search history.

(56) References Cited

U.S. PATENT DOCUMENTS

| | | | |
|---|---|---|---|
| 4,517,540 A | | 5/1985 | McDougal |
| 5,289,088 A | | 2/1994 | Andoh |
| 5,535,582 A | * | 7/1996 | Paweletz .............. D01H 4/14 310/67 R |
| 2006/0278963 A1 | | 12/2006 | Harada |
| 2011/0074397 A1 | | 3/2011 | Bulumulla |
| 2012/0068693 A1 | | 3/2012 | Ocket |
| 2012/0094555 A1 | | 4/2012 | Calverley |
| 2012/0299685 A1 | | 11/2012 | Yokota |
| 2016/0152327 A1 | | 6/2016 | Bertels |
| 2016/0163445 A1 | | 6/2016 | Bertels |

FOREIGN PATENT DOCUMENTS

| | | |
|---|---|---|
| DE | 2744125 | 4/1979 |
| DE | 3203958 | 8/1982 |
| DE | 10 2004 06320 | 5/2006 |
| EP | 0 035 964 | 9/1981 |
| EP | 1 260 998 | 11/2002 |
| EP | 1 353 436 | 10/2003 |
| EP | 1878911 | 1/2008 |
| EP | 2 551 190 | 1/2013 |
| GB | 2 370 922 | 7/2002 |
| JP | S56140562 | 11/1981 |
| JP | S59 101068 | 6/1984 |
| JP | H06 325948 | 11/1994 |
| WO | WO 96/19670 | 6/1996 |

OTHER PUBLICATIONS

International Search Report from PCT/NL2014/050459 dated Jul. 8, 2014.
International Search Report from PCT/NL2014/050458 dated Oct. 15, 2014.
Norris (2005) Flight International "Levitating Fan Rotor Paves Way to Electric Flight " 168 (4994): 22.

* cited by examiner

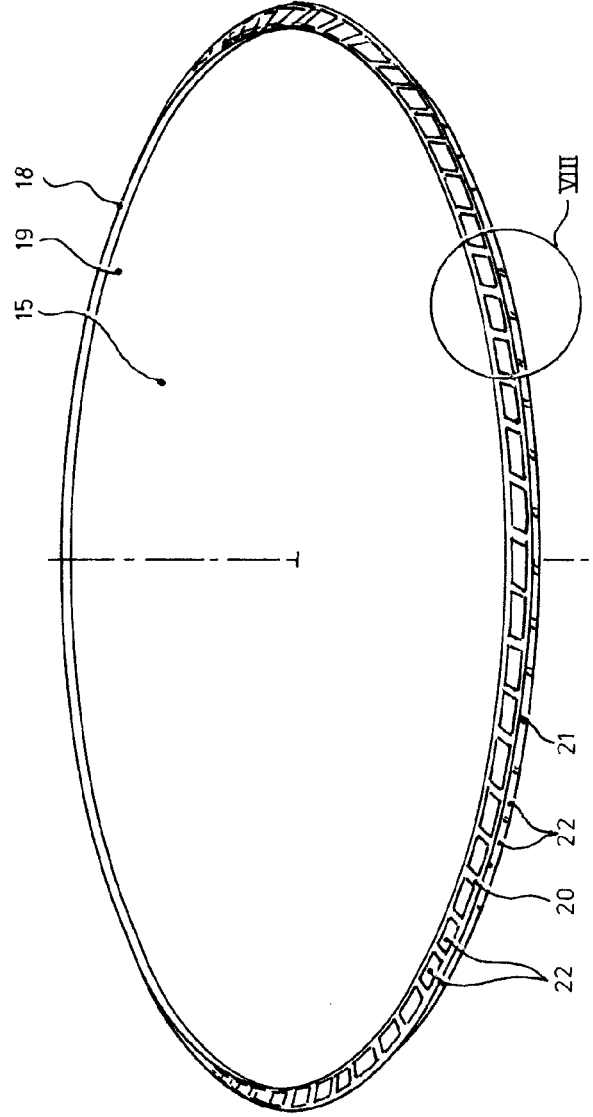
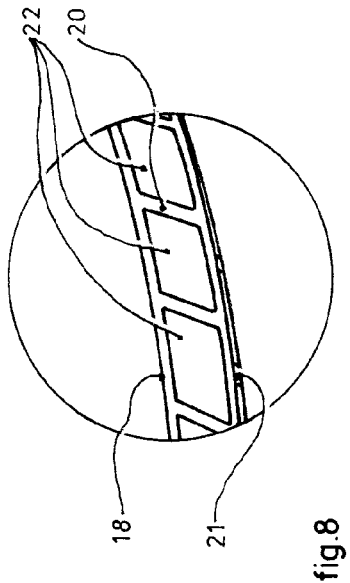
fig.7
fig.8

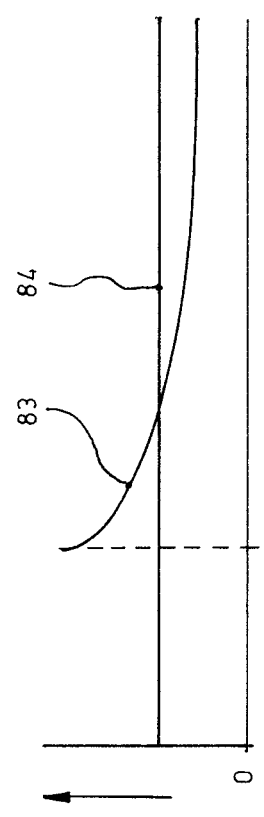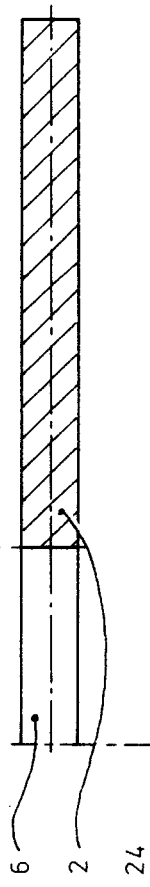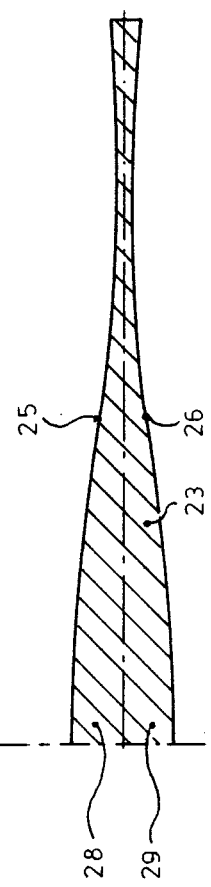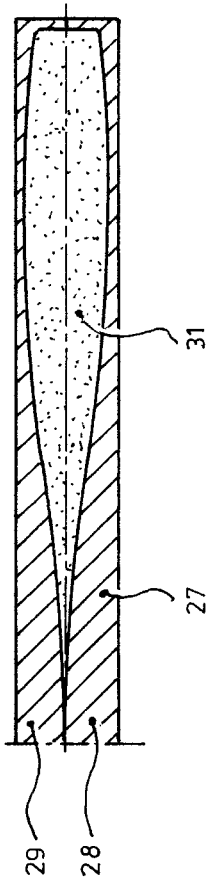

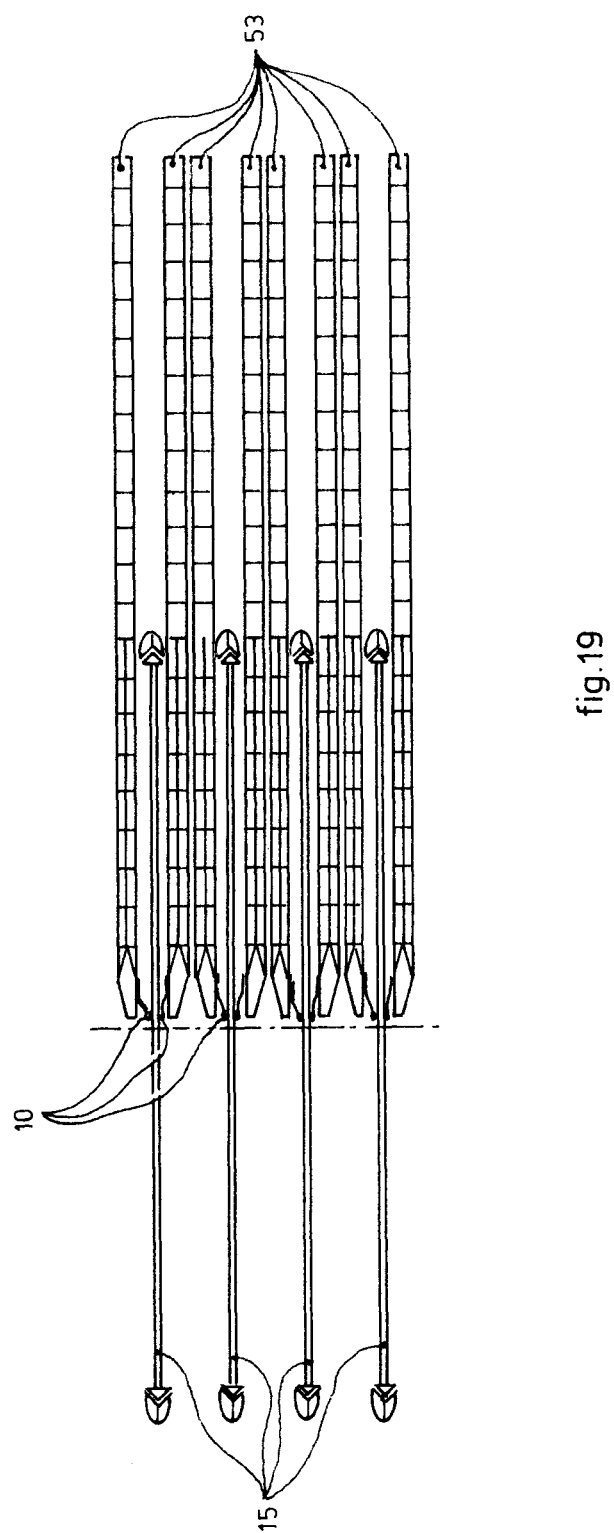

US 9,583,132 B2

ARRANGEMENT FOR ROTATABLY DRIVING A ROUND DISK

RELATED APPLICATIONS

This application is a 35 U.S.C. §371 national phase application of PCT/NL2014/050497 (WO 2015/012685), filed on Jul. 21, 2014, entitled "Arrangement for Rotatably Driving a Round Disk", which application claims priority to Netherlands Application No. 2011214, filed Jul. 24, 2013, which is incorporated herein by reference in its entirety.

The invention relates to a device for rotary driving of a round disk consisting for instance substantially of aluminium, tensively strong glass or a ceramic material, such as a memory disk of a computer, a flywheel, a carrier for a CD, a DVD or the like, which device comprises a stator disposed fixedly relative to a frame and a rotor rotatably drivable relative to the stator.

Such a device is for instance known in the form of a hard disk drive, i.e. a device for rotary driving of a memory disk of a computer. Such memory disks are usually manufactured from aluminium and have a central hole into which the central spindle of the rotor of a drive motor fits closely.

The stator of the motor is supported by a frame disposed fixedly relative to the computer or the server.

Such drive motors take up a great deal of space in relation to the memory disk and consume a large amount of electrical energy in relation to their performance.

It is a primary object of the invention to substantially reduce the dimensions of the electric drive of a round disk and to substantially improve the efficiency of the drive.

With a view to these objectives the invention provides a drive device of the type stated in the preamble, which has the feature that the rotor comprises a concentric ring to which the peripheral edge of the disk is connected;

the ring has two equal truncated conical surfaces with mutually opposite orientations, has for instance a radial section with at least partially the general shape of an isosceles triangle or an isosceles trapezium, the base of which extends parallel to the central axis, also the rotation axis, of the rotor and the two equal sides of which converge outward;

the stator has an encircling recess, the form of which corresponds to that of the ring, such that the ring fits with clearance into the recess;

magnetically active elements, for instance permanent magnets, are added to each of the truncated conical surfaces corresponding to said sides, which elements are placed angularly equidistant and the poles of which debouch on said surfaces;

the poles of the electromagnets, each with a core and a coil, equally placed equidistantly on the magnetically active elements debouch on both the corresponding surfaces of the recess;

this such that the ring with the magnetically active elements and the frame with the electromagnets together form an annular induction motor;

an electronic unit is added to the electromagnets which is configured to supply the electromagnets with alternating currents such that through the electromagnetic interaction between the electromagnets and the magnetically active elements the rotor is driven rotatingly; and the electronic unit is also configured to supply the electromagnets with alternating currents such that the rotor ring is suspended magnetically during operation.

As in the case of magnetic hovertrains, the advantage of magnetic suspension is that the relative movement between the rotor and the stator is frictionless. This eliminates a source of malfunction, there is no wear and heat dissipation and additional noise production do not occur.

According to a very important aspect of the invention, the device is embodied such that the half-apex angles of the truncated conical surfaces have a value of 45°±15°.

The uniformity and the mirror-symmetrical placing of the truncated conical surfaces ensures a symmetrical play of forces, both in respect of driving and the magnetic suspension of the rotor. This latter can hereby be active in any spatial position in stationary operation, and can also eliminate disturbances, for instance changes in position, in effective manner. The electronic unit comprises for this purpose a negative feedback co-acting with the electromagnets which effectively suppresses changes in position of the rotor resulting from external causes.

For the purpose of smooth running and small periodic speed variations which correspond to the mutual distance between the poles, an embodiment is recommended in which the magnetically active elements of the one conical surface are offset half a pitch distance relative to the magnetically active elements of the other conical surface and the electromagnets are disposed correspondingly. This achieves that the effective drive frequency, i.e. the frequencies of the alternating currents with which the electromagnets are supplied by the electronic unit, becomes twice as great. In combination with the moment of inertia and the rotation speed of the disk, this achieves that periodic speed variations are substantially reduced relative to the drive frequencies.

Likewise with a view to a steady drive with smooth transitions, an embodiment is recommended in which the poles of the magnetically active elements and/or the poles of the electromagnets each have a form narrowing toward their ends.

Still further improvement can be realized with a variant in which the end zones of the magnetically active elements and/or the end zones of the electromagnets overlap each other over some distance.

Mechanically simple to realize and easy to produce on industrial scale is an embodiment in which the rotor ring is assembled from two parts which are arranged on two respective sides on the edge of the disk and are mutually connected, for instance by glueing, welding or by means of at least one snap connection. Use can also be made of a flat screw coupling. The flat surfaces to be connected to each other are each provided with a shallow fine screw thread. The surfaces are moved toward each other and displaced counter to the direction of the screw threads until the screw threads mesh with each other and a very strong screw connection is brought about.

Inexpensive and reliable is an embodiment in which the rotor ring is manufactured from plastic by pressing, injection moulding or the like.

This latter embodiment can have the feature that the rotor ring is assembled from two parts manufactured by pressing, injection moulding or the like and subsequently connected to each other, which parts are connected to each other over adjacent surfaces of the ring corresponding to the main plane of the ring.

According to yet another aspect of the invention, the device has the special feature that the device takes a multiple form and is configured for rotary driving of at least two disks. It will be apparent that the memory capacity of the memory unit of which the hard disk drive according to the invention forms part can be substantially increased by the use of more than one disk.

In a simple embodiment this device has the special feature that the disks are drivable for coupled rotation.

According to the invention the disks can be coupled for magnetic rotation. The rotor rings can be provided for this purpose with permanent magnets, wherein the permanent magnets of adjacent disks exert attractive forces on each other, whereby, when only one rotor ring with the associated disk is driven, all disks magnetically coupled thereto are also set into rotation. It will be apparent that in that case only one of the rotor rings need be the rotor of an annular induction motor. The rotating coupling can take place at the edge, in the area of the central zone, or a combination thereof.

The principle of the invention can further be used to advantage with an embodiment in which the disks are drivable for individual rotation. In such an embodiment every temporarily unused disk can be at rest and driven only at the moment this is required.

Of great importance is an embodiment in which the or each disk is a memory disk of a computer and a write head and/or a read head supported by a movable arm is added to the or each disk such that the or each head covers the whole active information surface of the disk during rotation of the disk, the arm being displaceable only in its longitudinal direction under the control of the computer. The usual arm, which is often referred to as "wiper", is carried pivotally at the periphery of the disk and can follow a curved path over the surface of the disk. Through rotation of the disk it can cover the whole usable information surface of the disk. The pivoting drive requires a drive unit which takes up a relatively large amount of space. The use of only a longitudinal displaceability with an associated actuator has the great advantage that, while an actuator must have a length corresponding to the total stroke of the head, it is thin such that it can easily be fitted into the space available between the components of the disk drive, wherein it must also be borne in mind that the placing of the components can be chosen in accordance with the form of the actuator.

It is known that an arm with head, or "wiper", can be added on both sides to a memory disk for a computer. In the case of the known drives with wipers a disk drive cannot be easily designed such that it is suitable to accommodate a plurality of wipers on one side of the disk. This is different in the invention, in which the very narrow actuators which take up little space do allow such an arrangement. In this respect the invention also provides an embodiment in which the number of arms added on one side of the disk amounts to at least two.

The usual pivotable wipers are all mutually coupled in the case of a multiple arrangement. Only one shared drive is necessary for this purpose. This can be disadvantageous in some circumstances since not every wiper necessarily always has to take up the same position. In that case the wipers must always move synchronously with an active wiper and as it were wait their turn to write or read the relevant information at the location dictated by the computer. In the case of the linear drive according to the invention, where no shortage of space occurs in respect of the drives, each actuator can be controlled individually. This greatly enhances the speed of the data processing, i.e. writing and reading. In addition, the individual linear drives are capable of producing great forces which are required for exerting great acceleration and deceleration forces on the arms. Because the displacement of each arm takes place in the direction of its maximum stiffness, so its longitudinal direction, no deformations or vibrations will occur in practice. This enhances the quality of the writing and reading of data.

A linear actuator can further be constructed such that the arm has a relatively small cross-sectional area. When light materials, for instance aluminium, carbon or other suitable materials, are used for the arm the accelerating and decelerating forces can remain very limited. Multiple disk drives further exist wherein the arms movable between two adjacent memory disks carry on each side a head for co-action with these respective disks.

In a determined embodiment the above described variant has the special feature that the longitudinal direction corresponds to the radial direction of the disk.

The radial direction is not a requirement however. A greater resolution, albeit at the cost of a lower speed of effective displacement over the disk, can be realized with a variant in which the longitudinal direction differs from the radial direction of the disk.

In a practical embodiment the device can be embodied such that the arm comprises the translator of a linear induction motor;

the translator has a prismatic form, i.e. has the same cross-section at any position, and fits with some clearance into a space defined by the stator of the induction motor;

the translator comprises a number of equidistantly disposed magnetically active elements, for instance permanent magnets; and the stator comprises a number of electromagnets equally placed equidistantly on the permanent magnets and each having a core and a coil;

which coils are supplied with power by the computer via the electronic unit such that the arm is displaced successively in each case in its longitudinal direction relative to the disk between positions chosen by the computer.

Already discussed above is that the acceleration and deceleration forces can remain very limited through the use of linear actuators. This enhances a very low energy consumption and a rapid data processing.

According to a very important aspect of the invention, this latter variant can be embodied such that the cross-section of the translator has on both its sides the general shape of an isosceles triangle or of an isosceles trapezium, the inclining sides of which correspond to two side surfaces carrying permanent magnets; which permanent magnets co-act with the electromagnets of the corresponding walls of the stator; and the electronic unit supplies power to the electromagnets in a manner such that the translator is magnetically suspended inside the stator.

As a result of the magnetic suspension the translator moves in frictionless manner and no energy dissipation occurs other than that due to slight friction losses resulting from the displacement of the translator in the surrounding air.

For the purpose of an optimal stability in two independent directions parallel to the main plane of the disk, an embodiment is recommended in which the inclining sides have a position of $(45\pm10)°$ relative to the main plane of the disk.

For the purpose of an improved lateral stiffness and corresponding positioning stability of the head, use can be made of a variant in which the arm and the translator have a greater dimension in the direction parallel to the main plane of the disk than in transverse direction relative thereto.

The head can be of known electromagnetic type. Such a head has the known drawback that it is in friction contact with the magnetizable surface of the rotating disk. Such a contact causes wear, premature ageing and heat losses.

A contactless writing operation can be realized with an embodiment in which the write head comprises a laser controlled by the computer.

In a further embodiment the device has the special feature that the read head comprises a laser and an optical sensor, which sensor detects laser light which is reflected by the relevant surface of the disk and which corresponds to the information stored on this disk, and feeds signals corresponding thereto to the computer. It must be understood that the obliquely incident laser beam is polarized depending on the local magnetization of the reflective layer of the disk. The detector can detect this, provided it receives the laser light reflected from the surface of the disk via an analyser in correct angular position, i.e. a disk which transmits light polarized in a main direction and blocks light with a polarization direction perpendicular thereto.

The scanning can take place in wholly contactless manner. Use could optionally be made of an optically transparent element which transmits light of the wavelength of the laser light and has a smooth and rounded contact surface which has in common with the relevant surface of the disk a very low coefficient of friction. The arrangement of the relevant element, for instance a so-called bead of hardened glass or synthetic diamond, is optically designed such that the element allows practically unimpeded passage of laser light.

The invention further relates to a device of any of the above described types combined with a disk drivable by this device.

Of great importance is an embodiment in which the disk is free of a central through-hole.

The usual central through-hole in rotatably driven disks, for instance hard disks of computers, was essentially born of necessity. It has traditionally always been assumed that, in the absence of a better alternative, a drive motor has to be disposed centrally relative to the disk. Although they are highly advanced from a precision mechanics viewpoint, the drive motors are in principle very primitive systems afflicted by the drawbacks briefly referred to above, in particular a low efficiency and taking up a relatively large amount of space. Now that use can be made according to the invention of a disk without central through-hole, the advantage is gained that a greater part of the disk is available for data storage. It will be apparent that in the vicinity of the centre of the disk the linear speed relative to the head is so low that there can no longer be any significant data storage. There is nevertheless gain in space and an increase in the storage capacity of the hard disk. In addition, the central through-hole is no longer necessary owing to the use of the edge driving according to the invention, and the space taken up by the drive can be reduced very substantially by dispensing with the usual central motor drive.

Mechanical considerations also indicate that it is important to make use of disks without through-hole. As known in mechanics, the tensile stress in a rotating disk having the same thickness throughout is greatly dependent on the radial position. The tensile force in the disk increases further toward the centre, and the tensile force is at a maximum at the position of the edge of a possibly present central hole. It is therefore a known fact that it is not on their outer side that rapidly rotating disks break as a result of centrifugal forces, but on their inner side. When a central hole is present this cannot be adequately prevented, or at least not wholly. This is because a hole does not contribute toward the mechanical strength of the disk. This is different in the case of an integral, non-perforated disk according to the invention.

Here the central zone does in any case contribute toward the mechanical integrity of the disk, even at high rotation speeds and associated linear speeds.

In this respect the invention also provides a device in which the effective thickness of the disk corresponds at each radial location to that of a Laval disk such that the tensile stress in the disk occurring as a result of centrifugal forces during rotation is substantially equal at every radial location of the disk, and the disk has a form which at locations from about 70-90% of the radius gradually thickens again toward the edge of the disk.

A Laval disk has a substantially greater thickness in its central zone than at more radially remote locations. Close to the peripheral edge another thickening takes place, which is as it were a translation of the part of the theoretical Laval disk absent outside the edge, this disk extending to infinity. This is a fact known from the literature. The theoretically optimal Laval disk has a thickness as a function of the radial position such that the tensile force in the disk is always the same at any radial position during rotation.

A problem occurs if use were to be made of a Laval disk. The Laval disk has a curved form on both sides. This makes rapid movement of the write and/or read head over a surface of the disk problematic.

A disk is therefore recommended which does not have this drawback. In this respect the invention provides a device in which the disk is flat on both sides. In order to realize this the relatively heavy Laval disk, for instance of aluminium, could be embedded in a disk of polycarbonate which is flat on both sides. The magnetizable layers are arranged on the flat surfaces.

It is not wholly possible with such a structure to prevent the Laval principle being partially compromised. Owing to the presence of the additional mass the tensile force in the disk will not be the same throughout, which is indeed the case with the ideal Laval disk. The extra tensile forces will concentrate mainly in the central zone of the disk. Since this does not have a central through-hole as a result of the use of the edge drive according to the invention, this is in most cases not a great problem according to the invention. It is nevertheless recommended to emulate the ideal Laval disk as closely as possible.

With a view hereto the invention provides a variant in which the disk is divided in its main plane into two equal disk parts, each bounded by a flat surface and a curved surface, which curved surfaces are mutually connected at their central zone, and fixation means are present which hold the disk parts at a distance everywhere such that the flat outer surfaces everywhere have the same mutual distance and the disk has the same thickness throughout.

The two disk parts, for instance manufactured by injection moulding of aluminium, are in this way formed into one whole and the thus obtained disk has in the usual manner a flat and smooth surface on both sides.

It is important that the fixation means provide for an accurately determined mutual distance between the flat outer surfaces, whereby the disk has the same thickness throughout and is little or not susceptible to deformations during rotary driving. The invention provides in this respect an embodiment in which the space between the curved surfaces is filled with a light mass, for instance a hard plastic foam such as polyurethane foam, polyester foam or foam of a ceramic material.

Alternatively or in combination herewith the device can have the special feature that to the edge zone of at least one of the disk parts is added a spacer which, optionally together with a corresponding spacer on the edge zone of the other disk part, defines the mutual distance between said outer surfaces.

The most elegant technical solution is that where an upright peripheral rib having the general shape of a cylinder wall is added to both disk parts, these two peripheral ribs lying with their end surfaces against each other. Such peripheral ribs or other spacers can optionally also be arranged distributed in the space between the inner surfaces of the disk parts. Using such a structure the ideal Laval form can be substantially retained, while the stiffness of the disk and the constant thickness is nevertheless guaranteed under all circumstances.

Described above is an embodiment in which the disk is divided in its main plane into two equal disk parts, each bounded by a flat surface and a curved surface, which curved surfaces are mutually connected at their central zones, and fixation means are present which everywhere hold the disk parts at a distance such that the flat outer surfaces everywhere have the same mutual distance and the disk has the same thickness throughout. It is not possible with such an embodiment to prevent the filling mass extending to the edge between the curved inner surfaces of the disk parts. The filling mass consists of foam, which has a certain mechanical vulnerability, at least a considerably greater vulnerability than that of for instance the basic material of the disk, such as aluminium. It would now be possible to consider dispensing with the use of the spacer ribs as discussed above, and giving the disk parts a very slightly conical form, whereby the surfaces of the thus obtained disk are strictly speaking not completely flat but have a very slight conical form, for instance with an apex angle varying several degrees from 2×90°. This need not be a problem however if use is made according to the invention of a linear actuator with write and/or read head displacing in strictly radial direction relative to the disk. This becomes different in the case where the head moves along a path differing from the strictly radial direction. The path in that case has to follow the form of a cone section. This is a curved form which, although differing little from the straight line, nevertheless requires specific provisions in the case of a desired rapid displacement of the head.

According to a determined aspect, the invention can have the special feature that the rotor and/or the disk are supported by the frame via bearing means. It should be understood that the use of bearing means can be an advantage even in the case of magnetic suspension. Magnetic suspension is after all only effective during operation of the device. For mounting, assembly, servicing purposes, repairs, replacement of components and the like it can be important, especially in the case of relatively heavy disks, for the technician to be easily able to manually rotate the disk, or at least the rotor ring, when it is not in operation. The bearing means can be useful for this purpose. No or hardly any requirements are set for the bearings during operation in the case of magnetic suspension. They can therefore be deemed more as positioning means and provisions which ensure that the rotor is easily rotatable during repair operations.

A completely frictionless variant which uses no energy has the feature that the bearing means comprise sets of co-acting permanent magnets with opposite orientation on respectively the stator and the rotor ring, such that the repelling forces between the co-acting magnets provide for bearing-mounting and rotating suspension of the rotor.

The invention will now be elucidated with reference to the accompanying drawings. In the drawings:

FIG. 7 shows a perspective view of the disk with edge drive according to FIG. 5;

FIG. 8 shows the detail VIII of FIG. 3 on enlarged scale;

FIG. 9 shows the tensile stress in a known hard disk of a computer provided with a central through-hole, as a function of the radial position;

FIG. 10 shows a radial cross-section through half of a known memory disk with a central hole;

FIG. 11 shows a central cross-section through half of a Laval disk;

FIG. 12 shows a variant of the Laval disk according to FIG. 11 consisting of two half-disks with their curved sides facing toward each other;

FIG. 19 shows a view corresponding to FIG. 17 of a device according to the invention, comprising four centrally aligned disks with edge drive, to each of the surfaces of which disks are added actuators with arms and heads.

Figure 1:
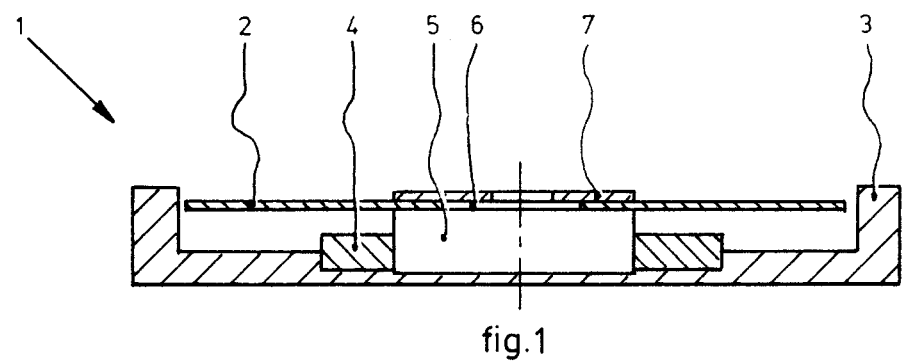
FIG. 1 shows a central cross-section through a known disk drive of a computer.

FIG. 1 shows a device 1 for rotary driving of a prior art memory disk 2. Device 1 comprises a frame 3, an electric motor 4 which is supported by this frame 3 and the rotor 5 of which is connected via a central through-hole 6 in disk 2 to a clamping ring 7 such that disk 2 is driven rotatably during rotation of the rotor.

Figure 2:
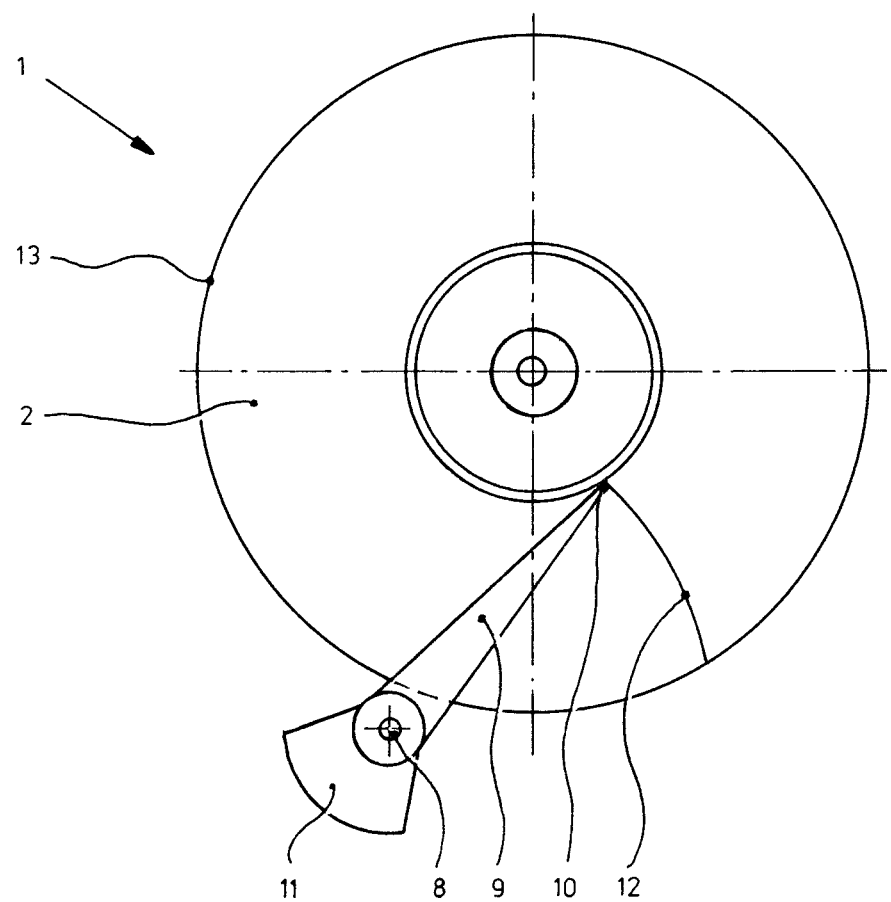
FIG. 2 shows a top view of a disk drive according to FIG. 1 with a pivotable arm or "wiper" which carries a write and/or read head.

FIG. 2 shows an arm 9 disposed pivotally by means of a hinge 8 and bearing at its free end a write and/or read head 10. Arm 9, and thereby head 10, can be pivoted along the curved path designated 12 by driving via a schematically shown drive mechanism 11. This path is bounded on the outer side by outer edge 13 of disk 2 and bounded on the inner side by clamping ring 14.

Figure 3:
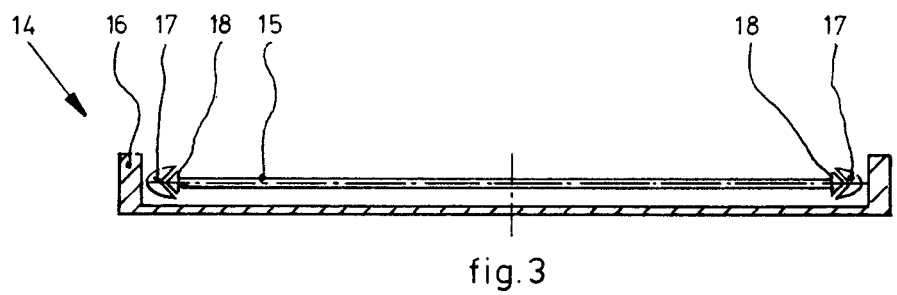
FIG. 3 shows a central cross-section corresponding to FIG. 1 through a disk drive according to the invention.

FIG. 3 shows a device 14 for rotary driving of a memory disk 15 which, other than memory disk 2 according to FIGS. 1 and 2, is not provided with a central hole. Device 14 comprises a frame 16 which supports an annular stator 17 of an edge drive 17, 18 for memory disk 15. Rotor ring 18 of drive 17, 18 is connected to edge zone 19 of memory disk 15. The stator and the rotor ring together form an annular induction motor. This will be discussed in more detail below.

Figure 4:
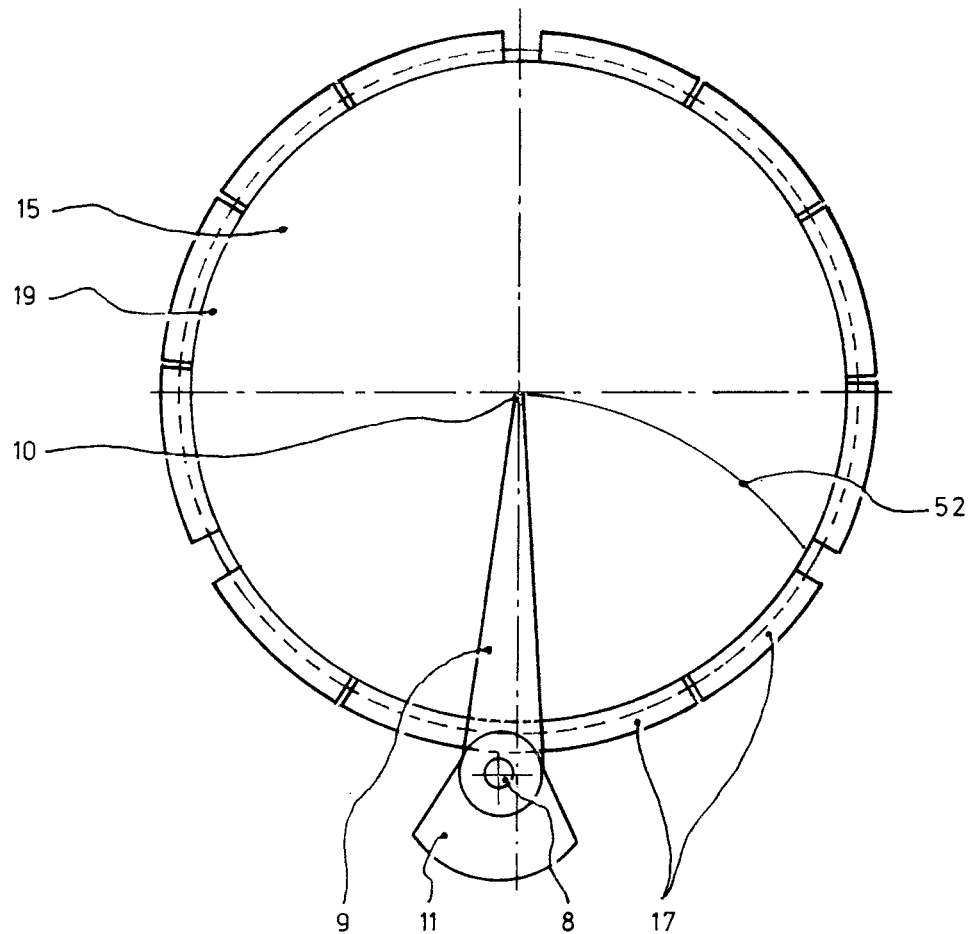
FIG. 4 shows a top view corresponding to FIG. 2 of a disk drive according to the invention with a pivotable wiper.

As FIG. 4 shows, memory disk 15 has a larger space available for memory storage. This is because the central hole is absent, nor is use made of a clamping ring 7 as shown in FIG. 1. Arm 9 can hereby be slightly longer than arm 9 according to FIG. 2 and the radial range of head 10 is slightly greater. This radial range is designated with reference numeral 52. A comparison to range 12 according to FIG. 2 shows that the range in question is greater. It should however be understood that the rotation speed in the central zone of memory disk 15 is substantially zero and that this central zone is therefore not readily usable for data storage.

Figure 5:
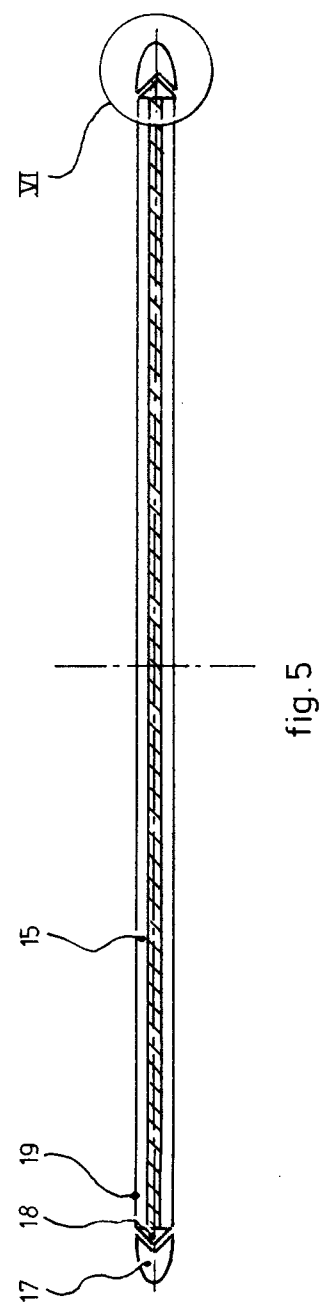
FIG. 5 shows a central cross-section through a disk with edge drive according to the invention.

FIG. 5 shows disk 15 on larger scale.

Figure 6:
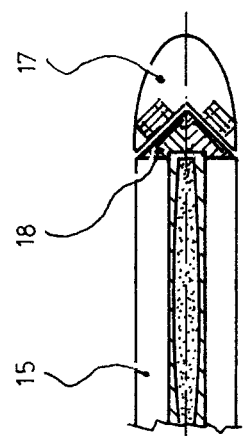
FIG. 6 shows the detail VI of FIG. 5.

FIG. 6, which shows detail VI of FIG. 5 on enlarged scale, particularly shows the construction of disk 15, the structure of rotor ring 18 and annular stator 17 to be described below.

FIGS. 7 and 8 show that rotor ring 18 has two truncated conical peripheral surfaces 20, 21 provided with electrically passive and magnetically active elements, all designated 22.

It is important that the boundaries of the magnetically active elements have an inclining position roughly transversely of the peripheral direction. This is relevant for setting rotor ring 18, and thereby disk 15, into rotation from standstill.

Elements 22 can be embodied as permanent magnets, or alternatively in the manner of a cage armature of an asynchronous motor, a layer of ferromagnetic material having thereover the more or less ladder-like peripheral pattern of for instance copper. In the case of the limited drive power necessary in the case of a memory disk, the ferromagnetic layer can be thin, for instance in the order of a maximum of 100-200 μm. The same applies for the copper tracks. Copper is an excellent electrical conductor and its resistance is for that reason very low, even in the case where the tracks have a small thickness, for instance 50 μm.

The magnetically active elements of surfaces 20, 21 are positioned mutually offset over half a pitch distance.

FIG. 10 shows the radial cross-section through half of a known memory disk or hard disk 2 of a computer. When this disk is driven rotatably as according to FIGS. 1 and 2, the disk is subjected at all locations to an outward directed tensile stress caused by the centrifugal force acting on every local mass element.

FIG. 9 shows with curve 83 the qualitative progression of this tensile stress, which is solely a function of the radial position of a mass element at a determined radial position. It will be apparent that the tensile stresses in the material in the vicinity of central hole 6 is maximal and at high rotation speeds can even cause breakage in the edge zone of the hole.

It is known that a disk intended for rotation can be designed such that it is subjected during rotation to the same radially outward directed tensile force at every radial position. Such a disk is referred to as a Laval disk.

FIG. 11 shows a theoretical Laval disk with the same radius as disk 2. This Laval disk according to FIG. 11 is designated with reference numeral 23. It should be understood that the Laval disk has the greatest thickness in the area of its central axis 24 and becomes thinner as the radial position increases. In the present case the thickness of the disk increases again from a radius of about 80% of the total radius of the disk. This can be understood from the insight that the ideal theoretical Laval disk extends infinitely, so has an infinite radius. The total mass of such a theoretical disk is as it were concentrated in the final 20% of disk 23, so the edge zone. This explains why the thickness gradually increases again toward the outermost radial position.

Line 84 in FIG. 9 shows the progression of the tensile stress in Laval disk 23. This line is straight, corresponding to a constant value of tensile stress, and thus demonstrates that the tensile stress in disk 23 is equal throughout.

It will be apparent that Laval disk 23 in this form is not suitable as carrier of a ferromagnetic memory layer, as is usual in the case of hard disks or memory disks of computers. Owing to the curved form of the two surfaces of disk 23 it is not readily possible to move head 10 over surfaces 25 or 26, since these are formed such that head 10 must always take up an axial position subject to the radial write or read position of head 10.

It is possible to contemplate adding a disk-like casing of for instance polycarbonate to disk 23 such that the internal Laval structure of disk 23 is retained and the polycarbonate casing has two end surfaces having a fixed mutual distance independently of the radial position. Such a disk is not easy to make however, and moreover has the drawback that it is not easy with such a structure to make the tensile force equal at all radial positions of the disk with any degree of accuracy.

FIG. 12 shows an important alternative. Laval disk 27 in the embodiment according to FIG. 12 can be seen as an assembly of the two halves 28, 29 of the Laval disk 23 according to FIG. 11, which are disposed relative to each other and mutually connected with their central zones 30 in the shown manner, for instance by glueing, ultrasonic welding or any other suitable process. Arranged in the space between disk halves 28 and 29 is a foam core 31 consisting of a light and hard type of foam, for instance a ceramic foam.

Figure 13:
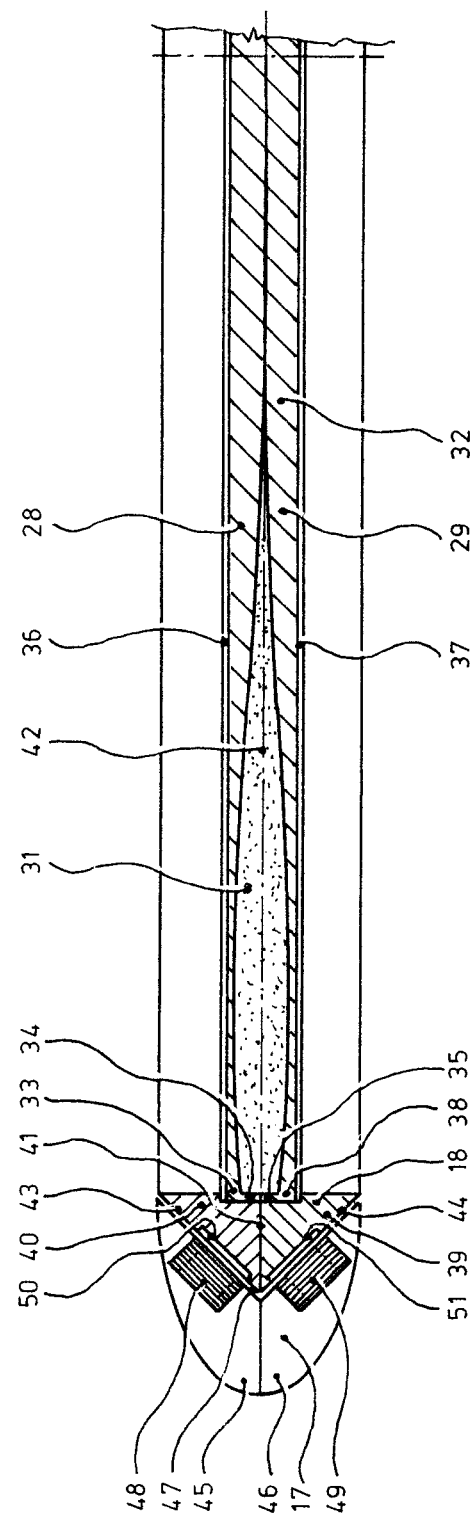
FIG. 13 shows a central cross-section through half of a Laval disk with edge drive according to the invention.

FIG. 13 shows the structure according to FIG. 6 on larger scale. A Laval disk 32 is constructed in the manner shown in FIG. 12, but has mutually co-acting spacers 34, 35 in the form of upright encircling ribs on the peripheral zones 33, 38 of disk halves 28, 29. Other than in the case of disk 27 according to FIG. 12, foam core 31 is hereby not exposed at the periphery but wholly covered by the co-acting ribs, which together fulfill the function of spacer. This structure ensures better than disk 27 according to FIG. 12 that the thickness of Laval disk 32 is the same throughout and that the mutual distance between ferromagnetic layers 36 and 37 is the same throughout.

The sides 43, 44 are disposed on peripheral zones 33, 38 at angles which are equal but in opposite directions. The form of the side facing away therefrom with which ring 18 engages round disk 32, is not relevant for the operation of the device. The general aim will be to make ring 18 as light as possible. On the basis of this consideration the form of ring 18 with a minimal mass as according to FIG. 13 appears to be a logical choice.

Stator 17 likewise consists of two parts. These are designated with 45 and 46. The recess 47 of stator 17 facing toward ring 18 has a form corresponding to the form of said equal sides 43, 44 of ring parts 39, 40 of rotor ring 18. This ring 18 is therefore freely rotatable in this recess 17 with a small clearance. Stator parts 45, 46 are each provided with a collar of electromagnets 48, 49 which are placed peripherally in angularly equidistant manner and co-act magnetically with magnetically active elements 50, 51 which form part of ring parts 39, 40 and are placed at the same angular positions as electromagnets 48, 49. As discussed above, the magnetically active elements 50, 51 can be embodied as permanent magnets, but can also be embodied in the manner of the cage armatures of an asynchronous motor in the manner described with reference to FIGS. 7 and 8 with a ferromagnetic layer in combination with a ladder-like structure of electrically conductive tracks, for instance of copper.

An edge drive of a memory disk is realized in the described manner.

Figure 14:
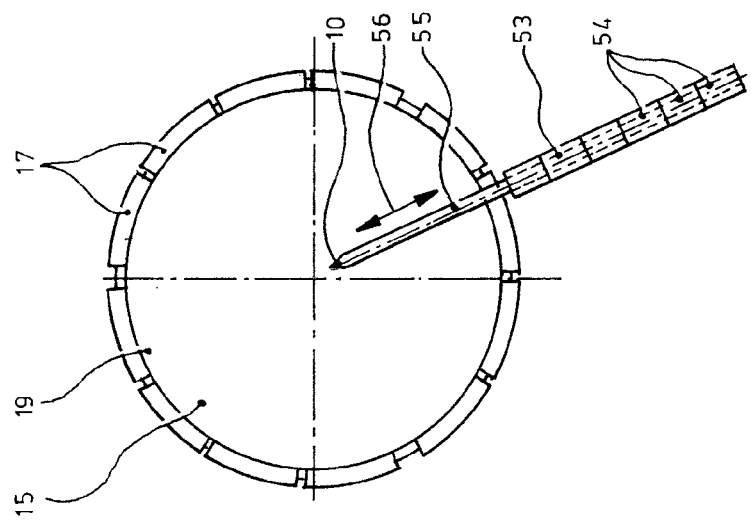
FIG. 14 shows a top view of a disk according to the invention with edge drive and a radial longitudinal arm with head.

In a view similar to FIG. 4, FIG. 14 shows that use could also be made according to the invention of a linear induction motor or actuator 53. This comprises six solenoids 54 which together bound an elongate cavity. Movable in this cavity in a manner to be described below is an arm or translator 55 which carries head 10 at its free end. As indicated with an arrow 56, head 10 is displaceable with this actuator 53 over the whole radial range of disk 15, as in the pivoting embodiment according to FIG. 4. The translator, which thus forms part of a linear motor, can take a very light and stiff form, for instance on the basis of carbon fibres held together in accordance with a known composite-technique by a suitable plastic. An extremely strong and light arm with bending stiffness can hereby be realized, whereby high displacement speeds are possible as according to arrow 56.

Figure 15A:
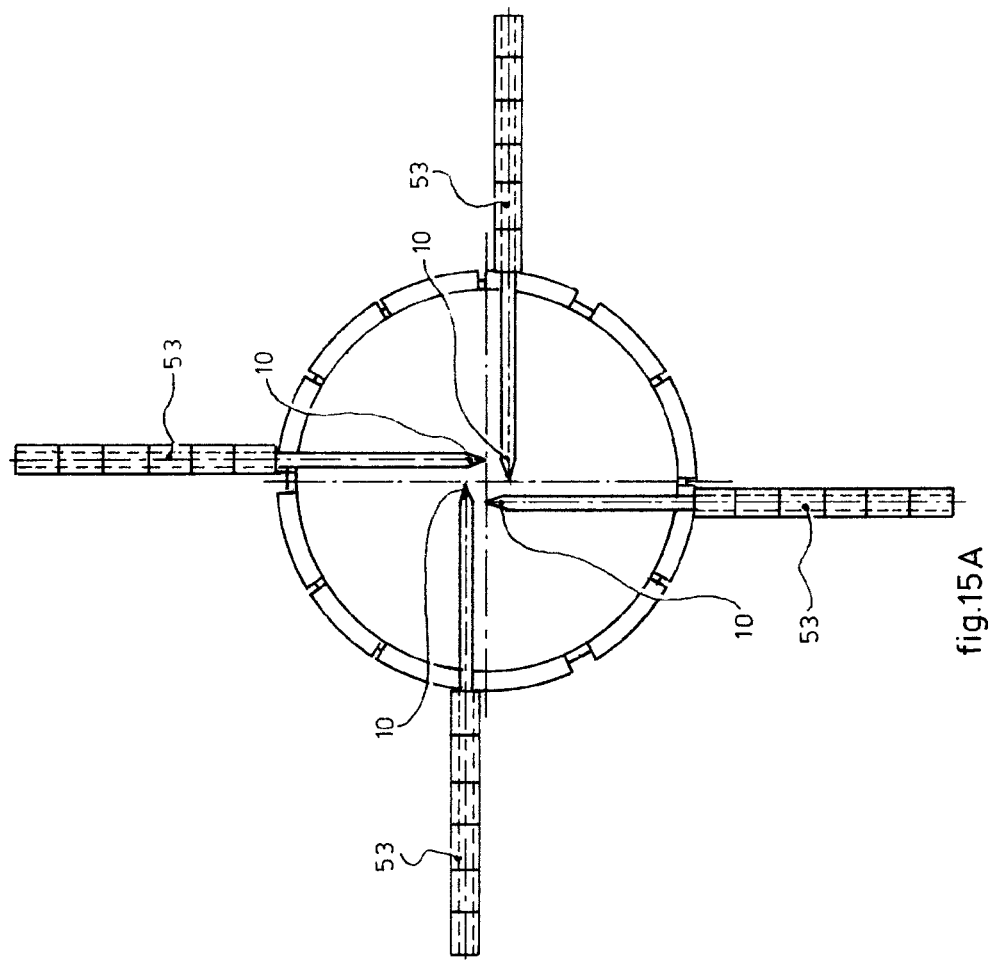
FIG. 15A shows a top view corresponding to FIG. 14 of a disk with edge drive, to which four linear actuators with arms with associated heads are added, wherein the longitudinal directions of the actuators differ from the radial direction of the disk.

FIG. 15A shows a variant in which four actuators, all designated 53, are disposed at mutual angles of 90° but have a direction of displacement differing from the radial direction according to FIG. 14. Actuators 53 are individually controllable, whereby the access speed of heads 10 to a determined radial memory location is four times greater.

FIG. 15B shows a variant in which, other than in the embodiment according to FIG. 15A, linear actuators extending in radial direction relative to disk 15 are added to disk 15. The figure shows that actuators 53 are positioned at mutual angular distances of about 20° and never disturb each other's positioning, even in the extreme case shown in FIG. 15B in which all three heads 10 are in their extreme position close to the centre point of disk 15. A comparison to FIG. 15A shows that in the arrangement according to FIG. 15B the space taken up by the three actuators is limited to a small area, i.e. an area of rather more than about 40°. This can in some conditions provide a more practical solution to a shortage of space during design of the device.

Figure 16:
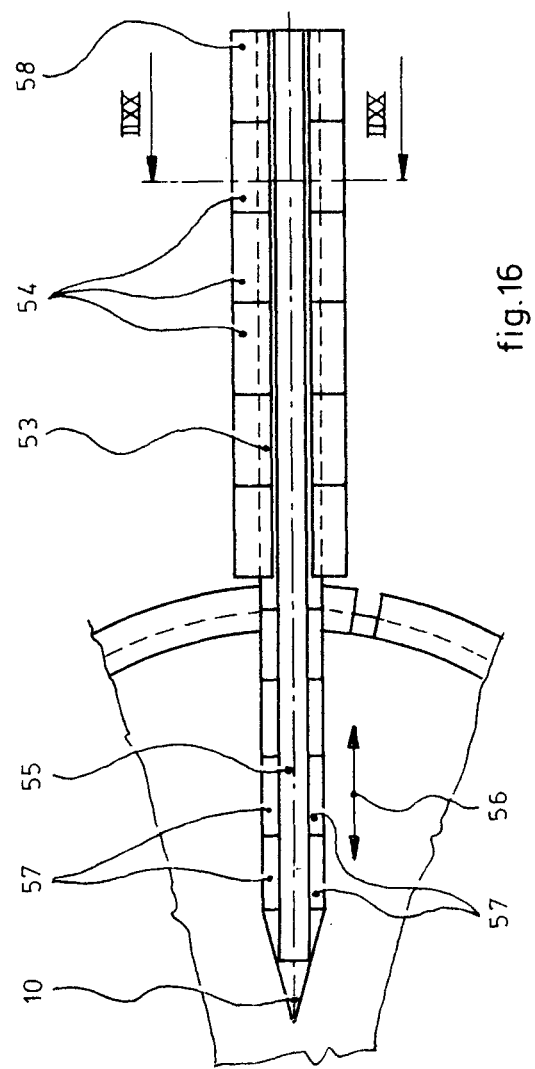
FIG. 16 shows a partly cross-sectional top view on enlarged scale of a disk with edge drive and a radial actuator consisting of a number of solenoids.
Figure 17:
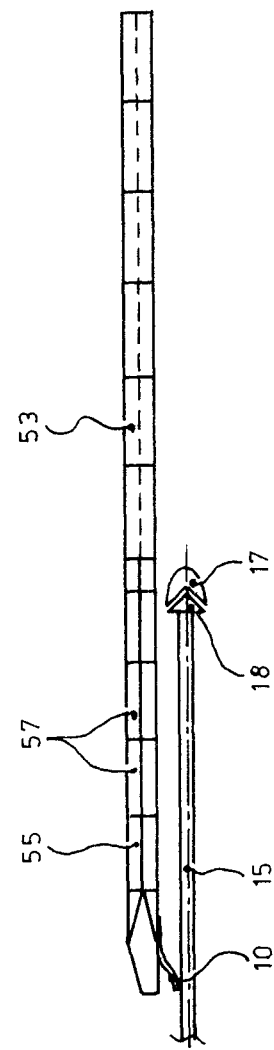
FIG. 17 shows a side view of the disk with actuator according to FIG. 16.

FIGS. 16 and 17 show actuator 53 according to FIG. 14. Translator 55 comprises a number of magnetically active elements which are all designated 57 and can be of the same type as the magnetically active elements 22 of rotor ring 18 according to FIGS. 7 and 8. The structure is such that it corresponds on both sides to that of rotor 18 and stator 17 according to FIG. 13.

FIG. 18A likewise shows an embodiment in which use is made of, in this embodiment, four magnetically mutually co-acting surfaces, wherein the four equal surfaces positioned at 45° to the translator fit with a small clearance into the V-shaped recesses in stator 58. In addition to the displacement as according to arrow 56, a magnetic suspension of translator 55 relative to stator 58 can also be realized by suitable control with specific alternating currents.

Figure 18:
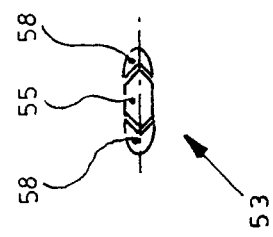
FIG. 18A shows the cross-section IIXX-IIXX of FIG. 16.
FIG. 18B shows the cross-section of FIG. 18A on larger scale.
FIG. 18C shows on the same scale a variant with an arm of square cross-section.
Figure 18B:
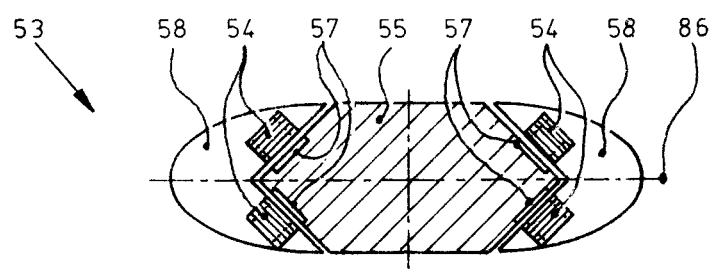

FIG. 18B shows the construction of the actuator according to FIG. 18A on enlarged scale. It will be apparent that the arm or translator 55 is provided along its length direction with the magnetically active elements 57 shown in FIGS. 16 and 17. These co-act with electromagnets or solenoids 54 for the purpose of effecting a longitudinal drive as according to arrow 56 (see FIG. 16). Suitable control of electromagnets 54 also realizes a frictionless magnetic suspension of arm 55 relative to stator 58.

Arm 55 has a relatively great lateral dimension so as to increase its lateral stiffness.

Figure 18C:
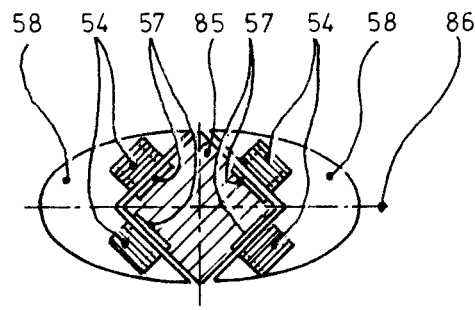

FIG. 18C shows an embodiment which only differs from the embodiment according to FIG. 18B in that arm 85 has the same dimension in the lateral direction as in the direction perpendicularly thereof. The cross-sectional form is therefore rectangular. As in the embodiment according to FIG. 18B, the four side surfaces in which the magnetically active elements 57 are located lie at angles of 45° relative to median plane 86.

FIG. 19 shows schematically a device 159 for individual driving of four memory disks 15 on the basis of the edge drive according to the invention. Use is made of two linear actuators 53 for each disk 15, one on each side.

The actuators can advantageously be individually controllable. An actuator which is temporarily out of use can thus be switched off, for instance in the case where the associated disk 15 is temporarily inactive.

Figure 15:
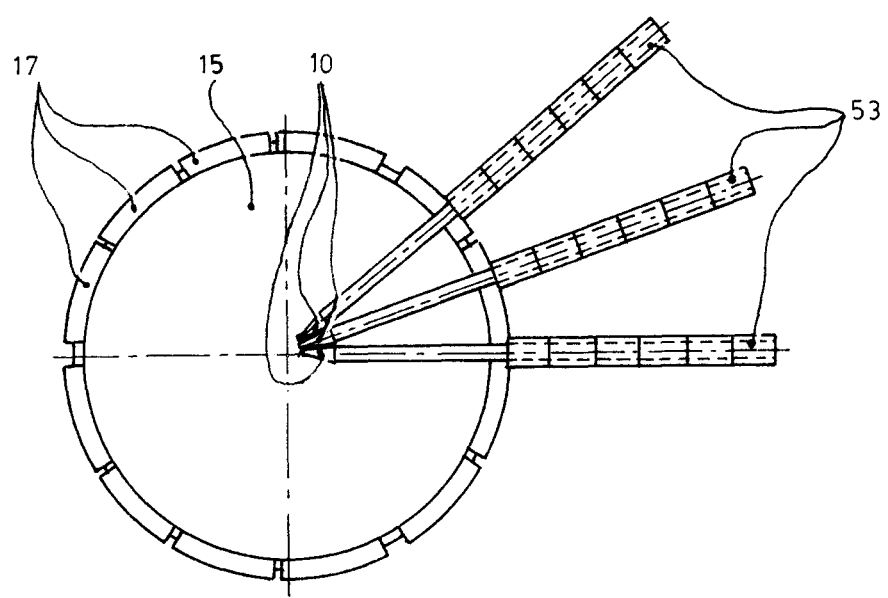
FIG. 15B shows a view corresponding to FIG. 15A of a variant in which three linear actuators are disposed in radial direction and require a small space outside the disk, i.e. an angle of about 40°.

It will be apparent that the number of actuators can still be substantially increased, for instance by disposing four actuators on each of the two sides of each disk as according to FIG. 15.

Figure 20A:
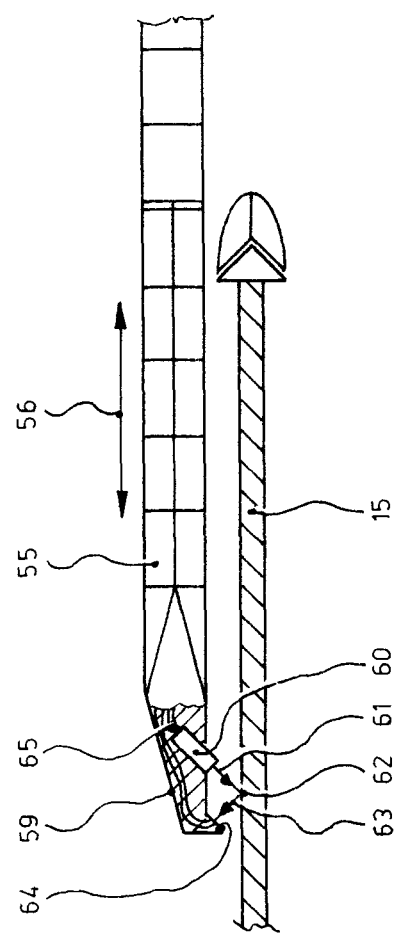
FIG. 20A shows a cross-section corresponding to FIG. 17 through a variant in which the head comprises a write laser and a laser also serving for read purposes, and comprises for read purposes a light sensor provided with a polarizing analyser.

FIG. 20A shows a head 59 which is carried by a translator 55. Head 59 comprises a laser 60 which directs a very narrow beam 61 of laser light at the relevant surface of disk 15. Depending on the state of local magnetization at impinging location 62, the reflected beam 63 will exhibit a certain degree of polarization. The polarization of this reflected beam 63 can be detected by a sensor 64 to which a polarizing analyser is added. By giving this analyser the correct angular position the sensor, which is essentially a photocell, will or will not detect light depending on the magnetization state at the impinging location. This information is transmitted as electrical signal via signal lines 65 to the computer of which the relevant device forms part.

Figure 20B:
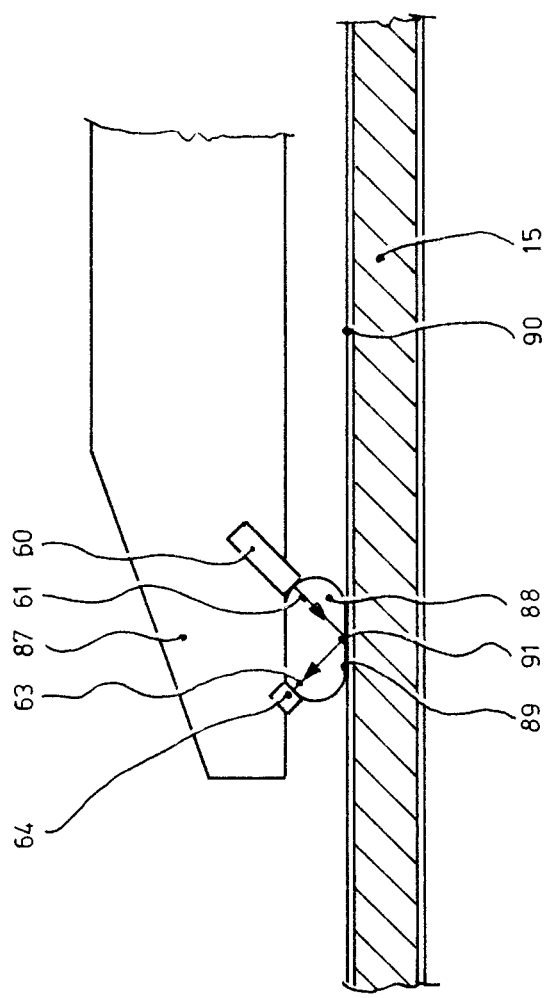
FIG. 20B shows a variant which makes use of an optically transparent bead and which does not therefore operate in contactless manner but with which a constant distance of the head relative to the surface of the disk is ensured under all conditions.

FIG. 20B shows a variant of the contactlessly operating head 59 according to FIG. 20A. In the embodiment according to FIG. 20B a glass bead 88 is added to laser 60 and sensor 64. This bead for instance takes the form as shown in FIG. 20B. The incident laser beam 61 enters the bead 88, which is optically transparent to the laser light, with perpendicular incidence on the local plane of incidence. A change in direction due to refraction of the laser beam does not therefore take place. The beam of laser light 63 reflected by the magnetic memory layer 90 exits bead 88 in transverse direction at the position of the sensor in the same way.

During design of the lower surface of bead 88, which can for instance be manufactured from hardened glass or synthetic diamond, it is necessary to take into account the Brewster angle which determines the limits within which the angle of incidence and the associated angle of reflection can be selected. It is possible to consider providing lower surface 89 with a roughly semi-spherical recess with rounded edge in the vicinity of the point of impingement 91. The effect of the change in direction, in the extreme case in the vicinity of the Brewster angle, is hereby eliminated.

Figure 21:
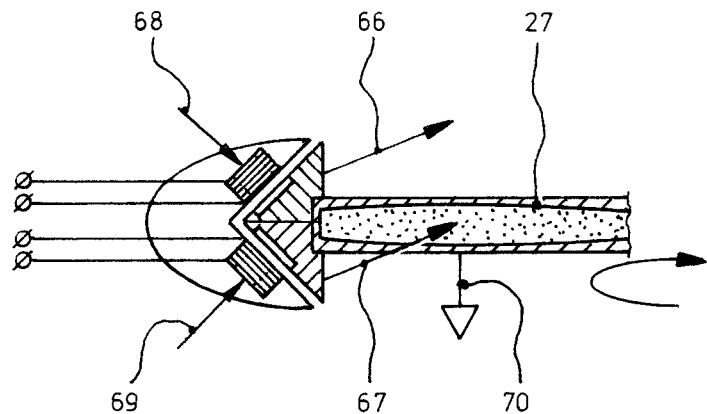
FIG. 21 shows a cross-section corresponding to FIG. 13 of an arrangement for the purpose of elucidating the magnetic suspension of the rotor and the disk, as well as the control based thereon.

FIG. 21 shows highly schematically the play of forces which occur in the annular configuration according to FIG. 13, and also in the linear configuration according to FIGS. 16, 17 and 18 in the case of a disturbance of the "ideal position" of respectively the rotor and translator relative to the stator.

Schematically indicated are the tangential forces 66, 67 corresponding to the linear forces in the direction of displacement and serving to drive respectively the rotor and translator in accordance with given instructions. FIG. 21 further shows the bearing-mounting forces 68, 69 which serve to maintain the magnetic suspension of respectively the rotor and translator relative to respectively the annular and linear stator. These bearing-mounting forces 68, 69 are generated by actuating the associated stator electromagnets, which are for instance designated in FIG. 13 with reference numerals 48, 49, by means of alternating currents. The bearing-mounting forces have to compensate for, among others, the weight force 70. It is also necessary to ensure that, in the case of disturbances, for instance a change in position of the drive device, the electronic unit which supplies power to the stators intervenes such that the bearing-mounting forces counteract the disturbance such that the magnetic suspension remains guaranteed, in combination with the nominal speed of the rotor or translator.

Figure 22:
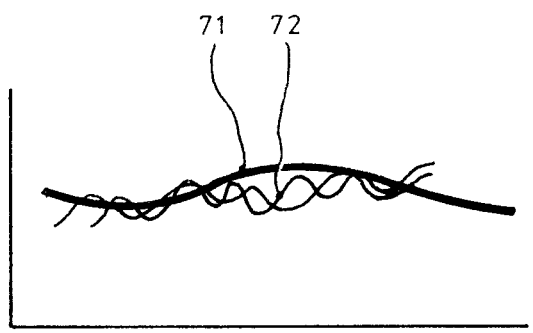
FIG. 22 shows a schematic graph of the currents through the electromagnets for rotary driving of the disk and for correcting disturbances.

FIG. 22 shows highly schematically that the control of the diverse electromagnets takes place with a superposition of two electric currents, of which the one designated 71 occurs in a relatively low-frequency range, while the disturbances, which are designated 72, comprise components in the higher frequency range. The final currents for all electromagnets are superpositions of currents 71 and 72.

Figure 23:
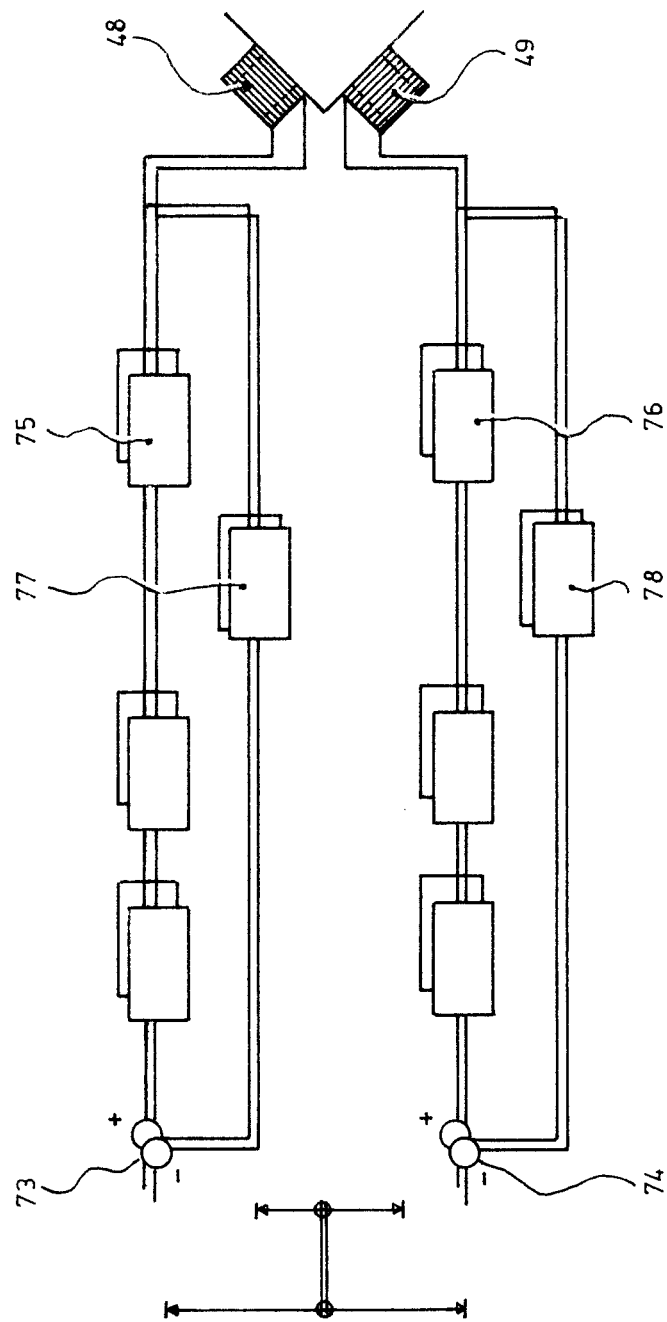
FIG. 23 shows a highly simplified diagram of control circuits for controlling the annular induction motor according to the invention with magnetic suspension.

FIG. 23 shows highly schematically an electronic unit for one set of electromagnets 48, 49. On the basis of three-phase current signals 73, 74, for each of the electromagnets 48, 49 of the relevant collar and electromagnets, three-phase currents with mutual phase shifts are fed via a power amplifier 75, 76 to the successive electromagnets 48, 49 of the respective collars. The rotor is driven as a result of the thereby generated rotary field. Linear driving of the translator of a linear actuator takes place in similar manner. These principles are generally known per se and need not be described here in detail.

The output signal of power amplifiers 75, 76 is detected. When the output current changes a negative feedback loop with a high-pass filter 77, 78 becomes active, resulting in a superposition of the nominal three-phase current signals and the relatively high-frequency signals which are superimposed on the low-frequency signals and counteract the detected disturbances such that the force exerted does not become manifest to any appreciable extent.

Figure 24:
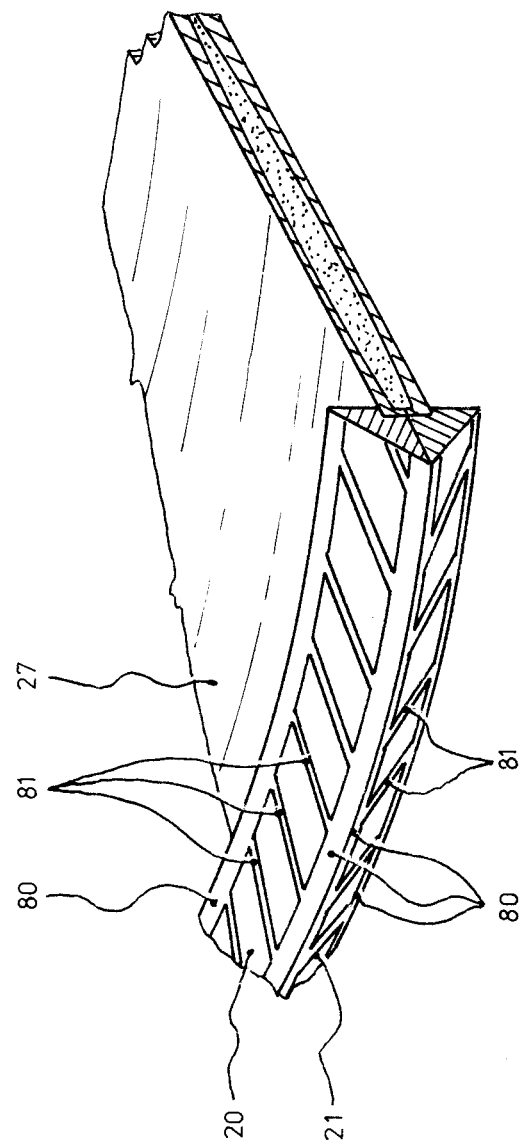
FIG. 24 shows a memory disk with a rotor ring based on the principle of the cage armature of an asynchronous motor.

FIG. 24 shows a segment of disk 27 with a rotor ring 18, the truncated conical surfaces 20, 21 of which are covered with a layer 79 of ferromagnetic material and a more or less ladder-like pattern of copper tracks arranged thereon.

The drawing shows that the tracks 81 extending more or less in radial direction have a slightly inclining position corresponding for instance to the inclining position recognizable in FIGS. 7 and 8.

Figure 25:
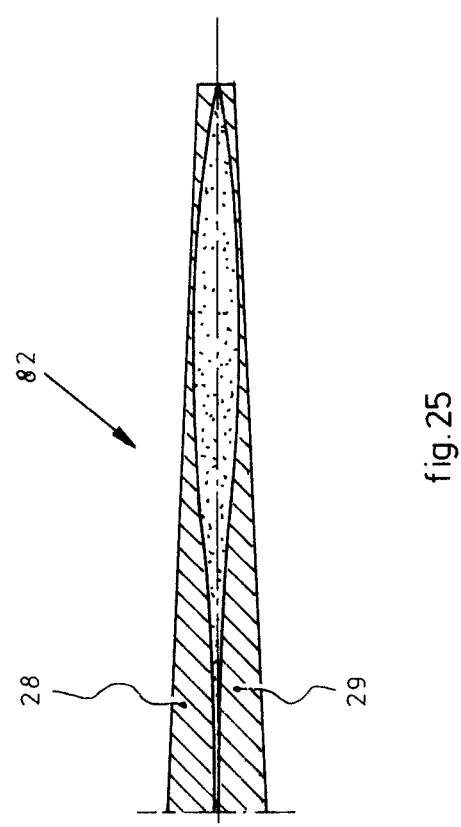
FIG. 25 shows a cross-section through half of a Laval disk, which can be seen as a variant of the Laval disk shown in FIG. 13.

FIG. 25 shows an alternative Laval disk 82 which, other than the Laval disk 32 according to FIG. 14, is not provided with co-acting peripheral ribs 34, 35 but is constructed such that the two disk parts 28, 29 are laid on each other such that, other than in the Laval disk 27 according to FIG. 12, the free peripheral zones of disk parts 28, 29 are brought into contact with each other. Although neither this figure nor the figures discussed in the foregoing are drawn to scale, it will nevertheless be apparent that disk 82 has two surfaces which both have a very gentle cone shape. Apex angles of 90° minus about 1°-3° must be envisaged here. This appears to be a small, almost negligible value, but even with such small angles the displacement of head 10 in a direction other than the radial direction, as for instance shown in FIG. 15, can cause the problem that the head must not follow a straight line but a curved line corresponding to a cone section. This can only be embodied in practice with a spring-mounted head based on mechanical contact. Although possible in principle, a disk of the type designated with reference numeral 32 in FIG. 13 will be recommended in practice.

In the housing of a known drive device for memory disks great dynamic forces occur which can disturb the dimensioning of the wiper and the associated head due to undesirable vibrations and deformations. The known housing must further also be able to discharge the heat of the central motor and the wiper drive, and must in general be arranged in largely electrically insulating manner relative to the device. Use is therefore usually made of a thick, somewhat flexible lacquer layer.

The housing for the device according to the invention is loaded substantially less mechanically and thermally. It can therefore take a thin-walled light form with a limited accuracy and a substantially smaller volume, and thereby a much cheaper form. Instead of being made from aluminium, the new housing can be manufactured from for instance a fibre-reinforced plastic.

The invention claimed is:

1. A device for rotary driving of at least one round disk, the device comprising:
    a stator disposed fixedly relative to a frame, the frame having electromagnets attached thereto;
    a rotor rotatably drivable relative to the stator;
    the rotor comprising a concentric ring to which the peripheral edge of the disk is connected, the ring having at least one surface;
    the stator having an encircling recess including at least one surface area, the form of which corresponds to that of the ring such that the ring fits with clearance into the recess;
    magnetically active elements on the at least one surface of the ring, which elements are placed angularly equidistant and the poles of which debouch on the at least one surface of the recess;
    poles of the electromagnets are equally placed equidistantly on the surface of the recess; and
    wherein the ring with the magnetically active elements and the frame with the electromagnets together form an annular induction motor.

2. The device as claimed in claim 1, each disk is a memory disk of a computer and a write head and/or a read head supported by a movable arm is operatively associated with each disk such that each head covers a whole active information surface of a disk during rotation of the disk, wherein;

the arm is displaceable only in its longitudinal direction under control of the computer;

the arm comprises the translator of a linear induction motor;

the translator comprises a number of equidistantly disposed magnetically active elements;

the stator comprises a number of electromagnets placed equidistantly on the magnetically active elements; and which electromagnets are supplied with power by the computer via an electronic unit such that the arm is displaced successively in each case in its longitudinal direction relative to the disk between positions chosen by the computer.

3. The device as claimed in claim 2, wherein the translator has a prismatic form having the same cross-section at any position, and fits with some clearance into a space defined by the stator of the induction motor.

4. The device as claimed in claim 3, wherein the cross-section of the translator has on its sides the general shape of an isosceles triangle or of an isosceles trapezium, the inclining sides of which correspond to two side surfaces carrying magnetically active elements, which magnetically active elements co-act with the electromagnets of the corresponding walls of the stator; and the electronic unit supplies power to the electromagnets in a manner such that the translator is magnetically suspended inside the stator.

5. The device as claimed in claim 4, wherein the arm and the translator have a greater dimension in the direction parallel to the main plane of the disk than in a transverse direction relative thereto.

6. The device as claimed in claim 1 combined with a disk drivable by said device.

7. The device as claimed in claim 6, wherein the disk is free of a central through-hole and an effective thickness of the disk corresponds at each radial location to that of a Laval disk such that the tensile stress in the disk occurring as a result of centrifugal forces during rotation is substantially equal at every radial location of the disk, and the disk has a form which at locations from about 70-90% of the radius gradually thickens toward the edge of the disk.

8. The device as claimed in claim 7, wherein the disk is flat on both sides and divided in its main plane into two equal disk parts, each bounded by a flat surface and a curved surface, which curved surfaces are mutually connected at their central zone, and fixation means are present which hold the disk parts at a distance everywhere such that the flat outer surfaces everywhere have the same mutual distance and the disk has the same thickness throughout.

9. The device as claimed in claim 6, wherein the disk is supported by the frame via bearing means.

10. The device as claimed in claim 9, wherein the bearing means comprise sets of co-acting permanent magnets with opposite orientation on respectively the stator and the rotor ring, such that the repelling forces between the co-acting magnets provide for bearing-mounting and rotating suspension of the rotor.

11. The device according to claim 1, wherein:

the ring has two equal truncated conical surfaces with mutually opposite orientations, having a radial section with at least partially the general shape of an isosceles triangle or trapezium, the base of which extends parallel to the central axis, also the rotation axis, of the rotor and the sides of which converge outward;

the magnetically active elements are on each of the truncated conical surfaces corresponding to the sides of the ring; and the poles of the electromagnets are equally placed equidistantly on the magnetically active elements debouch on each corresponding surface of the recess.

12. A system for operating a device according to claim 1, comprising an electronic unit which is configured to:

supply the electromagnets with alternating currents such that through the electromagnetic interaction between the electromagnets and the magnetically active elements the rotor is driven rotatingly; and to supply the electromagnets with alternating currents such that the rotor ring is suspended magnetically during operation.

13. The device as claimed in claim 11, wherein the magnetically active elements of one conical surface are offset half a pitch distance relative to the magnetically active elements of the other conical surface and the electromagnets are disposed correspondingly.

14. The device as claimed in claim 11, wherein the poles of the magnetically active elements and/or the poles of the electromagnets each have a form narrowing toward their ends.

15. The device as claimed in claim 14, wherein end zones of the magnetically active elements and/or end zones of the electromagnets overlap each other over some distance.

* * * * *